United States Patent Office 3,371,990
Patented Mar. 5, 1968

3,371,990
PRODUCTION OF HYDROGEN CYANIDE
Lawrence J. Krebaum, St. Louis, Mo., assignor to Monsanto Company, St. Louis, Mo., a corporation of Delaware
No Drawing. Continuation of application Ser. No. 48,362, Aug. 9, 1960. This application July 19, 1963, Ser. No. 296,376
10 Claims. (Cl. 23—151)

This application is a continuation of my copending application Ser. No. 48,362 filed Aug. 9, 1960, and now abandoned.

The present invention relates to the production of hydrogen cyanide and, more particularly, to the production of hydrogen cyanide from nitriles.

While it is well known that nitriles can be hydrogenated in the presence of suitable catalysts such as Raney nickel, cobalt, and the like to produce amines, little if any attention has been directed to the reaction of nitriles with hydrogen in the absence of catalysts. It has now been discovered that nitriles can be converted to hydrogen cyanide in almost quantitative yields by hydrogenolysis of the nitriles in any empty tube at temperatures within the range from about 600° C. to about 850° C. Any nitriles, for example, aliphatic, cycloaliphatic, aromatic, or aliphatic aromatic nitriles or mixtures thereof can be reacted with hydrogen according to the process of this invention to yield hydrogen cyanide. Such nitriles are organic compounds of the formula R—C≡N wherein R is a radical chosen from the group consisting of alkyl, alkenyl, cycloalkyl, cycloalkenyl, aryl, alkaryl and aralkyl radicals having from 1 to 20 carbon atoms, or dinitriles of the formula

CN—R—CN wherein R is a divalent organic radical. Suitable nitriles include among others, acetonitrile, propionitrile, butyronitrile, isobutyronitrile, valeronitrile, capronitrile, enanthionitrile, caprylonitrile, lauronitrile, myristonitrile, palmitonitrile, acrylonitrile, methacrylonitrile, crotononitrile, 3-butenenitrile, 4-pentenenitrile, 2-hexenenitrile, fumaronitrile, malononitrile, succinonitrile, cyclohexanecarbonitrile, benzonitrile, o-tolunitrile, m-tolunitrile, p-tolunitrile, 1-naphthonitrile, 2-naphthonitrile, phthalonitrile, benzyl cyanide, cinnamonitrile and the like.

The hydrogenolysis of the nitriles can be effected in reaction vessels which are constructed of materials which are inert to the reactants and capable of withstanding the temperatures employed. Suitable materials are refractory non-catalytic materials such as silica or quartz, heat resistant glass, and porcelain, or inert metals. Preferred for use as the reaction vessel is an empty cylindrical tube.

While the optimum reaction temperature is about 700° C., the reaction can be conducted at temperatures within the range from about 600° C. to about 850° C. Some reaction occurs even at temperatures below 600° C. but the reaction is so slow as to be impractical. Likewise, reaction can be effected above 850° C. but at temperatures above this upper limit the reaction equilibrium becomes unfavorable and products other than HCN are produced in increasing number and percentage. Products in addition to HCN in the hydrogenolysis reaction are mostly other simple nitriles and hydrocarbons such as methane, ethane, ethylene, propylene and the like. Experimental data have established that no amines whatsoever are produced in the reaction. The by-product nitriles can be reacted further either in a separate reactor or recycled through the same reactor and completely converted ultimately to hydrogen cyanide.

A wide range of reactant ratios can be employed. Mole ratios of nitrile to hydrogen varying from 1:0.5 to 1:100 can be used. Generally, an excess of hydrogen is employed and nitrile-to-hydrogen ratios of from 1:2 to 1:30 are the most advantageous.

Reaction time, i.e., the time during which the nitrile-hydrogen mixture is maintained at reaction temperature in the reaction zone, varies with the particular temperature employed and depends upon the conversion desired. At the lower end of the temperature range, longer reaction times are required than at the high end of the range for equivalent conversions. Generally, satisfactory results are obtained with reaction times from about 0.1 to about 50 seconds and preferably, reaction times varying from about 1 to about 10 seconds are used in the preferred temperature range. While inert diluent gases such as argon, nitrogen and the like can be employed to regulate the reaction time, the use of such gases in any sizeable amounts affects the rate of reaction by slowing it down and consequently results in lowered conversion over a given period of time.

The pressure employed is preferably atmospheric but operation at either subatmospheric or superatmospheric pressure is feasible.

The following examples will further illustrate the invention but these are not intended to limit its scope in any manner whatsoever.

Example 1

The apparatus employed comprised a reactor consisting of an unpacked "Vycor" (96% silica) tube having an effective length of 20 cm. disposed within a muffle furnace together with inlet and outlet manifolds, a nitrile vaporizer and accessory lines, a mixing chamber for the reactant gases, and a product gas receiver. Prior to use, the system was warmed up while a purge gas such as argon was passed through it. Hydrogen and nitrile vapors were fed through rotameters into the mixing chamber and the mixed gases were then passed through the reactor which had been heated to the desired temperature at a controlled rate to give the desired reaction time therein. The effluent gas from the reactor was collected in a heated receiver from which it was exhausted into a sample bomb. Reaction times in the reactor were varied by using tubes of different diameters, by changing feed rates, or by adding an inert diluent such as argon to the mixture. A series of runs was made wherein acetonitrile was reacted with hydrogen following this procedure under various conditions of temperature, reactant feed ratio, reaction time, etc. Effluent gas samples were analyzed by means of a mass spectrometer. Conversions and yields calculated from the analytical data under the various conditions are recorded in Table I.

TABLE I

| Run No. | Temp. (° C.) | Mole Ratio Acetonitrile/H₂ | Diluent Argon (Moles) | Reaction Time (Sec.) | Acetonitrile Reacted (Percent) | Yield HCN (Percent of Theoretical) |
|---|---|---|---|---|---|---|
| A | 700 | 1.0/1.0 | 2.2 | 1.6 | 3.3 | 91.0 |
| B | 700 | 1.0/2.5 | 2.7 | 2.7 | 17.0 | 100 |
| C | 700 | 1.0/2.9 | 1.0 | 4.0 | 34.7 | 99.7 |
| D | 705 | 1.0/1.6 | None | 2.3 | 26.5 | 99.5 |
| E | 700 | 1.0/2.6 | None | 4.8 | 56.2 | 98.7 |
| F | 700 | 1.0/8.4 | None | 6.0 | 99.4 | 99.8 |
| G | 750 | 1.0/18 | None | 3.0 | 99.4 | 99.8 |

Example 2

Following the procedure of Example 1 propionitrile was reacted with hydrogen in the same apparatus. Results of the two runs made with the conditions employed are recorded in Table II.

TABLE II

| Run No. | Temp. (° C.) | Mole Ratio Propionitrile/$H_2$ | Reaction Time (Sec.) | Propionitrile Reacted (Percent) | Yield HCN (Percent of Theoretical) |
|---|---|---|---|---|---|
| A | 700 | 1.0/3.3 | 2.6 | 88.8 | 73.4 |
| B | 750 | 1.0/7.5 | 2.6 | 99 | 95 |

Example 3

Two experiments were conducted in which acrylonitrile was reacted with hydrogen using the apparatus and procedure described in Example 1. Conditions of reaction and results are tabulated below.

TABLE III

| Run No. | Temp. (° C.) | Mole Ratio Acrylonitrile/$H_2$ | Reaction Time (Sec.) | Acrylonitrile Reacted (Percent) | Yield HCN (Percent of Theoretical) |
|---|---|---|---|---|---|
| A | 770 | 1.0/29.2 | 0.34 | 95.1 | 70.3 |
| B | 830 | 1.0/21.3 | 0.32 | 98.1 | 97.8 |

Example 4

Benzonitrile was reacted with hydrogen in a mole ratio of approximately 1:20, according to the method of Example 1. The temperature of the reaction zone was maintained at about 695° C. and reaction time was approximately 6 seconds. Hydrogen cyanide and benzene were identified as compounds of the effluent gas by means of mass spectrographic analysis.

What is claimed is:

1. The process for producing hydrogen cyanide which consists essentially of reacting an organic mononitrile with hydrogen at a temperature within the range from about 600° C. to about 850° C.

2. The process for producing hydrogen cyanide which consists essentially of reacting an organic mononitrile with hydrogen at a temperature of about 700° C.

3. The process of claim 1 wherein the reaction time is in the range from about 0.1 to about 50 seconds.

4. The process of claim 2 wherein the reaction time is in the range from about 1 to about 10 seconds.

5. The process for producing hydrogen cyanide which comprises passing a gaseous mixture of an organic mononitrile and hydrogen in a molecular ratio in the range from about 1:0.5 to about 1:100 through an empty reaction vessel heated to a temperature from about 600° C. to about 850° C. at a rate such that the gas mixture is maintained at reaction temperature for a period of time from about 0.1 to about 50 seconds.

6. The process for producing hydrogen cyanide which comprises passing a gaseous mixture of an organic mononitrile and hydrogen in a molecular ratio in the range from 1:2 to 1:30 through an empty reaction vessel heated to a temperature of about 700° C. at a rate such that the gas mixture is maintained at reaction temperature for a period of time from about 1 to about 10 seconds.

7. The process for producing hydrogen cyanide which comprises passing a gaseous mixture of acetonitrile and hydrogen in a molecular ratio in the range from 1:2 to 1:30 through an empty reaction vessel heated to a temperature of about 700° C. at a rate such that the gas mixture is maintained at reaction temperature for a period of time from about 1 to about 10 seconds.

8. The process for producing hydrogen cyanide which comprises passing a gaseous mixture of propionitrile and hydrogen in a molecular ratio in the range from 1:2 to 1:30 through an empty reaction vessel heated to a temperature of about 700° C. at a rate such that the gas mixture is maintained at reaction temperature for a period of time from about 1 to about 10 seconds.

9. The process for producing hydrogen cyanide which comprises passing a gaseous mixture of acrylonitrile and hydrogen in a molecular ratio in the range from 1:2 to 1:30 through an empty reaction vessel heated to a temperature of about 700° C. at a rate such that the gas mixture is maintained at reaction temperature for a period of time from about 1 to about 10 seconds.

10. The process for producing hydrogen cyanide which comprises passing a gaseous mixture of benzonitrile and hydrogen in a molecular ratio in the range from 1:2 to 1:30 through an empty reaction vessel heated to a temperature of about 700° C. at a rate such that the gas mixture is maintained at reaction temperature for a period of time from about 1 to about 10 seconds.

References Cited

UNITED STATES PATENTS 2,429,459    10/1947    Harris _____ 23—151 X

OTHER REFERENCES

Forst et al.: "The Reaction of Hydrogen Atoms With Methyl Cyanide," Canadian Journal of Chemistry, vol. 32, No. 12, December 1955, pages 1814–1818.

EARL C. THOMAS, *Primary Examiner.*

OSCAR R. VERTIZ, *Examiner.*